(12) United States Patent  
Appelbaum et al.

(10) Patent No.: US 9,031,401 B1  
(45) Date of Patent: May 12, 2015

(54) CONVERTIBLE FLASH BAG

(71) Applicants: Moishe Appelbaum, Columbus, OH (US); Mat Marrash, Columbus, OH (US); Hilgard Muller, Felton, CA (US)

(72) Inventors: Moishe Appelbaum, Columbus, OH (US); Mat Marrash, Columbus, OH (US); Hilgard Muller, Felton, CA (US)

(73) Assignee: Moishe Appelbaum, Columbus, OH (US)

( * ) Notice: Subject to any disclaimer, the term of this patent is extended or adjusted under 35 U.S.C. 154(b) by 0 days.

(21) Appl. No.: 14/321,339

(22) Filed: Jul. 1, 2014

(51) Int. Cl.
*G03B 15/06* (2006.01)
*A45C 11/38* (2006.01)

(52) U.S. Cl.
CPC .............. *G03B 15/06* (2013.01); *A45C 11/38* (2013.01)

(58) Field of Classification Search
CPC ................................. G03B 15/06; A45C 11/38
USPC ................. 396/4, 198, 200, 544; 362/16–18; 206/316.1
See application file for complete search history.

(56) References Cited

U.S. PATENT DOCUMENTS

| 2,326,004 | A  | * | 8/1943  | Barrett ........................ 359/359 |
| 3,572,560 | A  | * | 3/1971  | Dolph ........................... 224/612 |
| 4,360,103 | A  | * | 11/1982 | Armstrong .................... 206/482 |
| 5,311,409 | A  | * | 5/1994  | King ............................. 362/17 |
| 5,347,432 | A  | * | 9/1994  | Chiavetta ....................... 362/18 |
| 5,778,264 | A  | * | 7/1998  | Kean ............................ 396/174 |
| 5,839,006 | A  | * | 11/1998 | Beckerman ................... 396/174 |
| 5,996,790 | A  | * | 12/1999 | Yamada et al. ............. 206/316.1 |
| 7,360,909 | B1 | * | 4/2008  | Hughes .......................... 362/18 |
| 7,399,097 | B1 | * | 7/2008  | DeLaPaz ........................ 362/18 |
| 2011/0217028 | A1 | * | 9/2011  | Sowder et al. .................... 396/4 |
| 2011/0255851 | A1 | * | 10/2011 | Honl ............................ 396/198 |
| 2013/0128491 | A1 | * | 5/2013  | Morris et al. .................. 362/17 |

* cited by examiner

*Primary Examiner* — W B Perkey
(74) *Attorney, Agent, or Firm* — Gottlieb, Rackman & Reisman, P.C.

(57) ABSTRACT

A modifiable enclosure that can be used to house an object and can be adapted and connected to the object to aid in directing a stream of light emanating from the object. The modifiable enclosure can include a first panel with a connecting element extending substantially about a periphery thereof and a second panel with connecting element extending substantially about a periphery thereof that is releasably fastenable to the connecting element extending substantially about a periphery of the first panel.

17 Claims, 7 Drawing Sheets

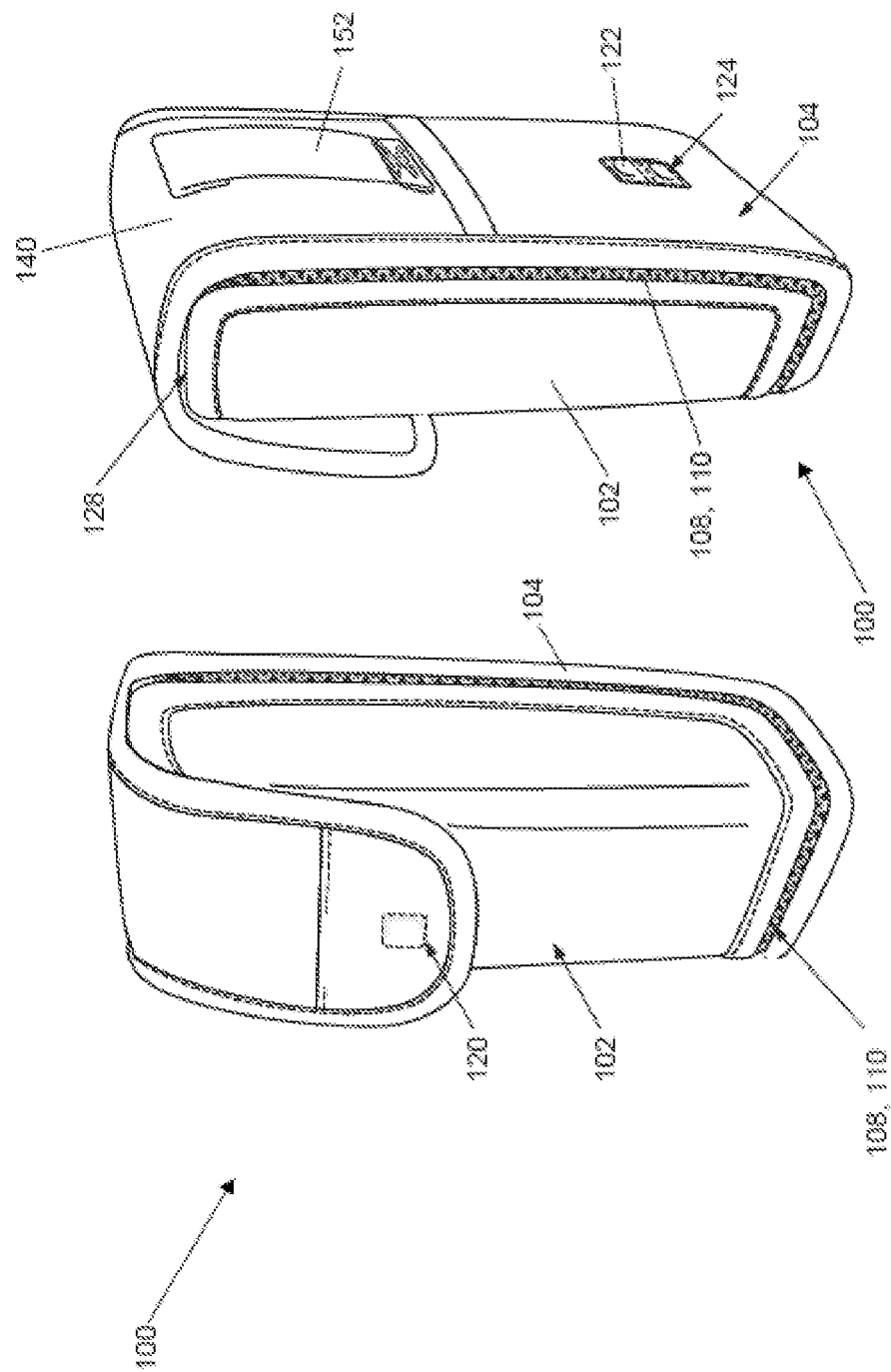

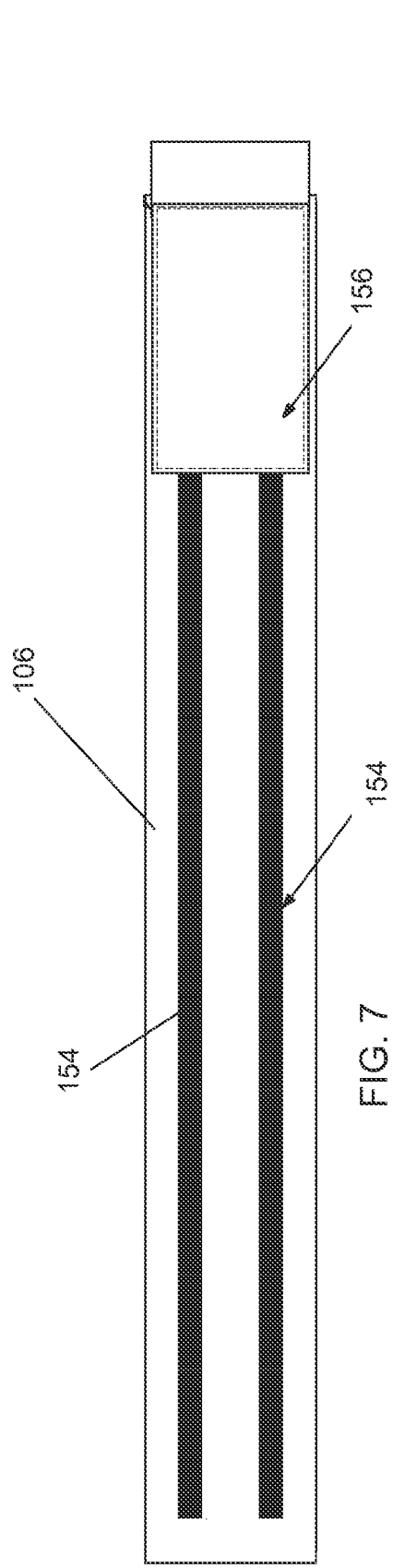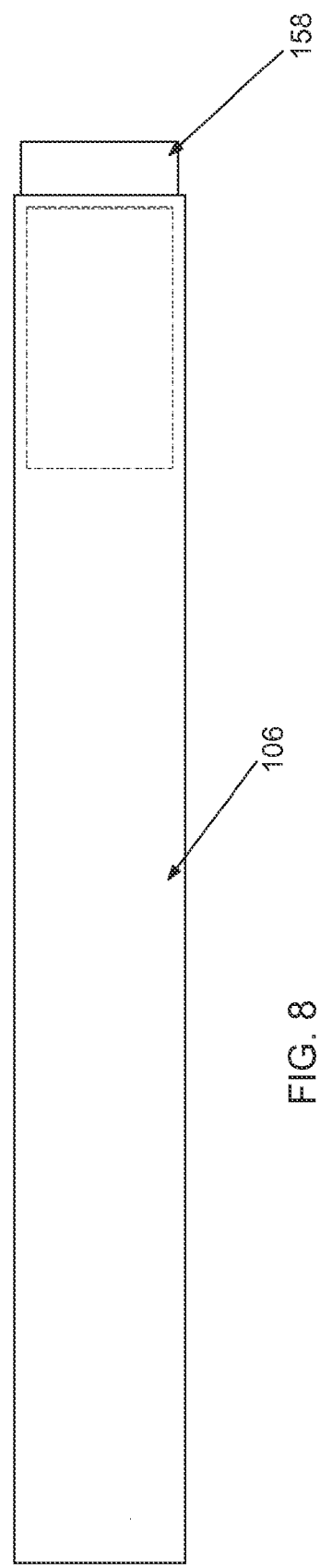
FIG. 7
FIG. 8

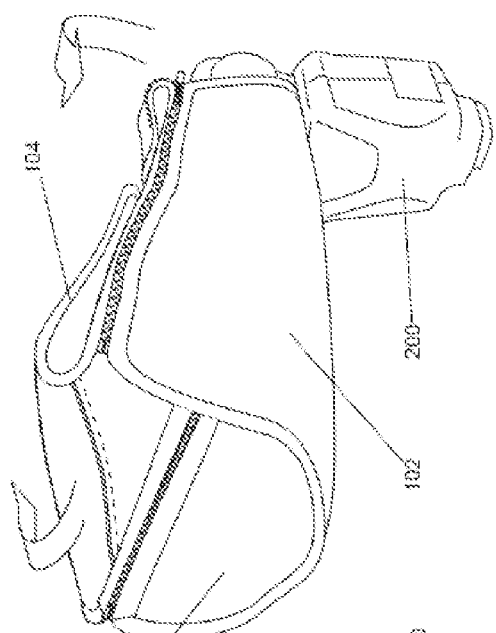
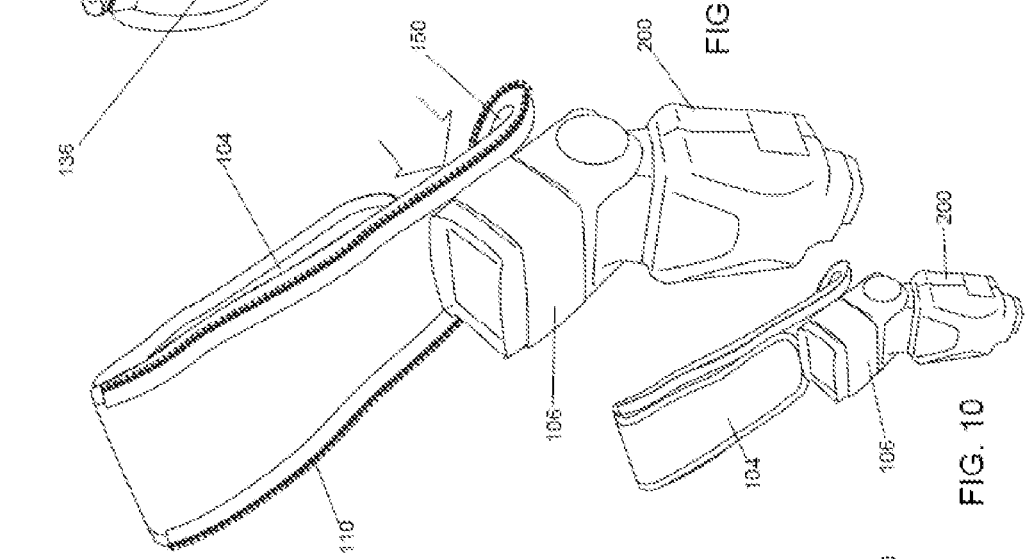
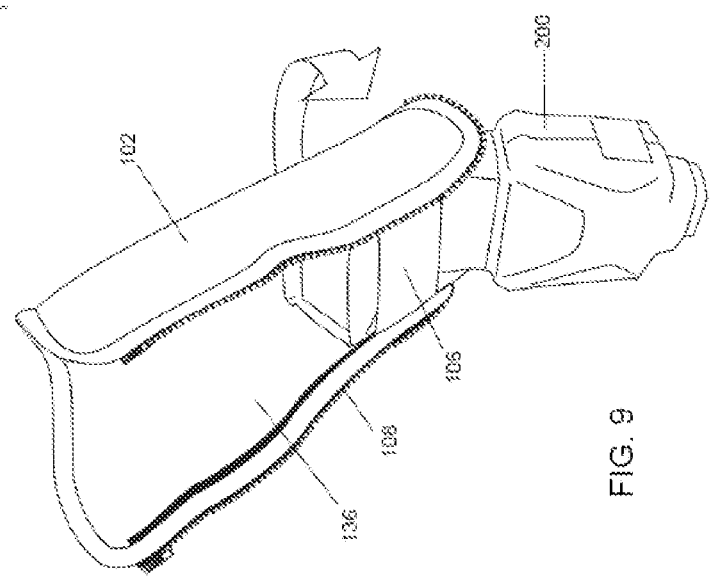
FIG. 12
FIG. 11
FIG. 10
FIG. 9

CONVERTIBLE FLASH BAG

FIELD OF THE INVENTION

The present invention relates generally to a modifiable enclosure and more particularly to a bag or case that can be used to house an object and can be adapted to aid in directing a stream of light.

BACKGROUND OF THE INVENTION

Enclosures that can be used to house an object, such as a flash unit that is mountable to a camera to produce artificial light to better illuminate an object being photographed, are known. Typically, these enclosures include, for example, bags or cases that have an opening in which an object can be arranged and a cover or flap that can seal the object within the enclosure. Known enclosures are designed solely to store and protect a flash unit from possible damage to during non-use.

Camera flashes are used for providing short term high intensity light for a photo shoot. In general, the flash is attached to or synchronized with a camera so that the flash is activated when a photo is taken. In other scenarios that flash may stay on.

At times, a flash may require additional external means for controlling lighting. That is, the intensity of the flash may need to be more localized, may be expanded, or may be intensified by providing various light modifiers around the flash. At times, such light modifiers have been provided by materials, such as screens, or umbrellas which encircle the flash. Each of these options provides a less than ideal result. For example, known modifiers may be overly bulky and difficult to carry and may be a larger size than actually needed.

The present invention overcomes these issues by providing a transformable carry case for the flash while encompassing a useable modifier.

SUMMARY OF THE INVENTION

The present invention is directed to a multi-purpose carrying device which becomes particularly useful with regard to the use of the object being carried. More particularly, the present invention is directed to a carry bag for a camera flash.

The carry bag can come in a variety of sizes, each of which may be customized to a particular flash. In the preferred embodiment, to encompass a flash of 206.5 mm (8.13 inches) by 73.15 mm (2.88 inches) by 50.8 mm (2 inches), the bag of the present invention has exterior dimensions of approximately 230.2 mm (9.05 inches) by 90 mm (3.54 inches) by 52.5 mm (2.07 inches). Other dimensions corresponding to different sized flashes may be used as well. The exterior of the carry bag is preferably formed of a soft material.

The carry bag of the present invention can be used for several purposes. It can protectively house a flash for storage and transport. Alternatively it can be reformed so as to provide a modifier, attached to the flash, for reflecting the flash's light. The modifier can be shaped as a cup to provide three sides of reflection, can be open to have one side of reflection, or can be shaped as a light box to have four or zero sides of reflection. In still another arrangement, the carry bag can be attached to the flash and not provide any reflective characteristics.

In the preferred embodiment, a modifiable enclosure has three portions which may interconnect in a variety of ways and for a variety of purposes. The enclosure comprises (1) a first panel that includes a first connecting element which extends substantially about a periphery of the first panel, (2) a second panel that includes a second connecting element extending substantially about a periphery of the second panel that is releasably fastenable to the first panel and (3) a securing device, such as to secure a flash when used with a flash, can be attached to said first and/or second panel. This securing device is preferably formed of a stretchy material, can be used to hold a flash in place when using portions of the enclosure as a modifier and can be stored in an external pocket of the second panel. The stretchy material of the present invention preferably has properties of revertability so as to return to an unstretched state when not in use holding an object in place. The first connecting element and the second connecting element can connect to one another and can be or include a first portion and a second portion, respectively, of a zipper that are connectable to each other by one or more sliders that are slidable about the first and/or second portion In one mode, the enclosure of the present invention may be used to protectively house a flash for transport. In another mode, the enclosure's elements can be rearranged to be secured to a flash and to provide a modifier for redirecting light.

In an embodiment, ballistic nylon material can substantially extend about at least the first side of the first panel and the second panel. In an embodiment, a reflective material can substantially extend about the second side of at least one of the first panel and the second panel.

In an embodiment, at least one expandable element can have at least a first end and a second end that are each fixable to the first panel and/or the second panel.

In an embodiment, the first element can include at least one securing element thereto. In an embodiment, a plurality of connecting elements can be secured to the second panel. The connecting elements can each include a pair of magnets or some similar attaching device.

In an embodiment, the second panel includes a first protrusion extending therefrom at a first end that can be adapted and configured to be flexible in a first direction and releasably fastenable to at least one of the first panel or the first side of the second panel, and the first protrusion can be adapted and configured to be flexible in a second direction and releasably fastenable to at least one of the first side of the second panel or the second side of the second panel. Additionally or alternatively, in an embodiment, the second panel can include a second protrusion extending therefrom at a second end that is adapted and configured to be flexible in at least one of a first direction and releasably fastenable to the second panel.

In an embodiment, the present invention discloses a first method of modifying an enclosure that comprises the steps of providing an enclosure, comprising a first panel including a first connecting element extending substantially about a periphery of the first panel and a second panel including a second connecting element extending substantially about a periphery of the second panel that is attached to the first connecting element, detaching, at least partially, the first connecting element and the second connecting element from each other and connecting the enclosure to an object to aid in directing a stream of light.

In an embodiment, the first method can further comprise the step of completely detaching the first connecting element and the second connecting element from each other. In an embodiment, the first panel can include an expandable element fastened thereto and the first panel is connected to the object by the expandable element. In an embodiment, the first method can further comprise the step the second panel includes an expandable element fastened thereto and the second panel is connected to the object by the expandable element. In an embodiment, the second element can include a protrusion extending therefrom that is adapted and configured to be releasably fastenable to at least one of a first side and a second side of the second element. In an embodiment, at least one of the first panel and the second panel can include a reflective material substantially encompassing a surface to aid in directing the stream of light.

In an embodiment, the present invention discloses a second method of modifying an enclosure, comprising the steps of providing an enclosure comprising a first panel including a first connecting element extending substantially about a periphery of the first panel and a second panel including a second connecting element extending substantially about a periphery of the second panel, and attaching the first connecting element and the second connecting element to each other to form a housing having an opening at one end.

BRIEF DESCRIPTION OF THE DRAWINGS

FIG. 1 is a first perspective view of an embodiment of a convertible flash bag of the present invention;

FIG. 2 is a second perspective view of the convertible flash bag of FIG. 1;

FIG. 7 is a top view of a strap of the convertible flash bag of FIG. 1;

FIG. 8 is a bottom view of a strap of the convertible flash bag of FIG. 1; and

FIGS. 9-12 are various configurations of the convertible flash bag of FIG. 1 attached to a camera flash.

DETAILED DESCRIPTION OF EMBODIMENTS OF THE INVENTION

Figure 3:
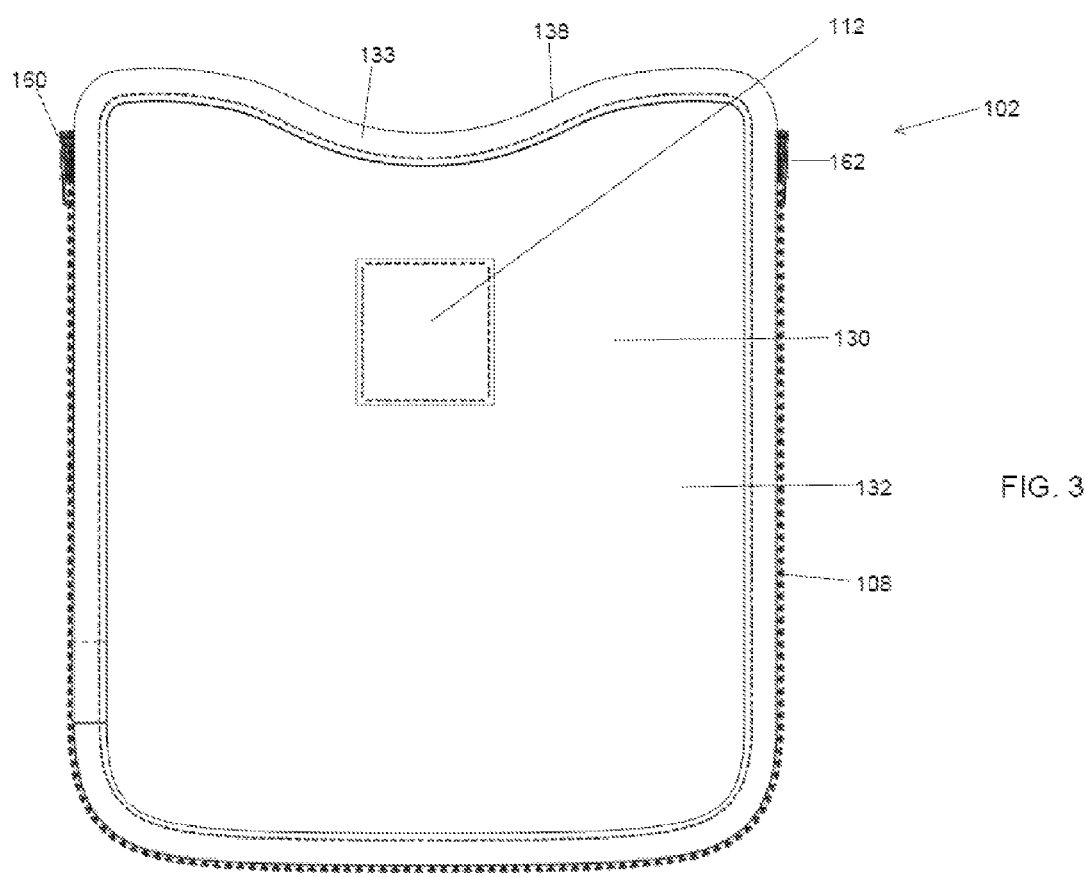
FIG. 3 is a first view of a first panel of the convertible flash bag of FIG. 1.

FIGS. 1-12 illustrate embodiments of a modifiable enclosure or carry bag, which is designated hereinafter by reference numeral 100. The enclosure 100 is capable of being modified between a first state in which the enclosure 100 can house an object, such as a camera flash unit 200 and a second state where the enclosure 100 is potentially attachable to the object to aid in directing a stream a light. In combination with the camera flash unit 200, the enclosure 100 can be configured in a variety of ways to reflect artificial and/or natural light from a source and direct the light or broaden the light and/or control shadows by bouncing the light off of the enclosure 100. Generally, the enclosure 100 includes a first panel 102, a second panel 104, a strap 106, connecting elements 108, 110 and a plurality of securing elements 112, 114, 116, 117, 118, 120, 122, 124, 126.

FIG. 1 shows an exterior view of one embodiment of the carry bag 100 of the present invention. As can be seen in FIG. 1, the carry bag 100 of the present invention is six sided. The carry bag 100 is structured preferably through zipper portions 108, 110, which are embedded in various lines of intersection between sides. The carry bag 100 can unfold by unzipping the zipper portions 108, 110. In the preferred embodiment, the carry bag 100 has one zipper. At least one of the portions 108, 110 can include sliders 160, 162 (see FIG. 3) to releasably connect the panels 102, 104 to each other. The sliders 160, 162 are prevented from being permanently disengageable from at least one of the portions 108, 110 by stops 164, 166 (see FIG. 5). As shown in an embodiment in FIGS. 3 and 4, the sliders 160, 162 are arranged on the zipper portion 108 associated with the first panel 102.

In a sealed state, where the connecting elements 108, 110 are sealed to house a flash, the sliders 160, 162 slide toward each other and can abut each other. In an unsealed state, where the connecting elements 108, 110 are at least partially disengaged from each other, the sliders 160, 162 slide in opposite directions to detach the panels 102, 104 from each other or create an opening in the enclosure 100 to allow a flash to be positioned within the opening.

FIGS. 1 and 2 illustrate the panels 102, 104 of the enclosure 100 attached together in a "closed position." When the enclosure 100 is in the "closed position", one side of each of first panel 102 and second panel 104 together serve as the exterior and the opposing side of each of the panels 102, 104 together serve as the interior of the enclosure 100. In the unfolded state, first panel 102 is generally square (see FIG. 3) with a small semicircular cut out on one side (the side not including the attachment device to second panel 104). Second panel 104 in its unfolded state is generally rectangular (see FIG. 5). Each panel 102, 104 has rounded corners.

As shown, at least a portion of second panel 104 extends at least partially over at least a portion of first panel 102 to cover an opening 128 formed at a first end of the enclosure 100 when the panels 102, 104 are joined together for the purpose of protecting an object housed therein. The second panel 104 includes a plurality of securing elements 120, 122, 124, 126 that are arranged beneath a first side 140 of the second panel 104. The second panel can further include a loop 152 that is fixed (e.g., stitched) to the first side 140 of the second panel 104 that can be used to attach the enclosure to a belt or the like, if desired.

Figure 4:
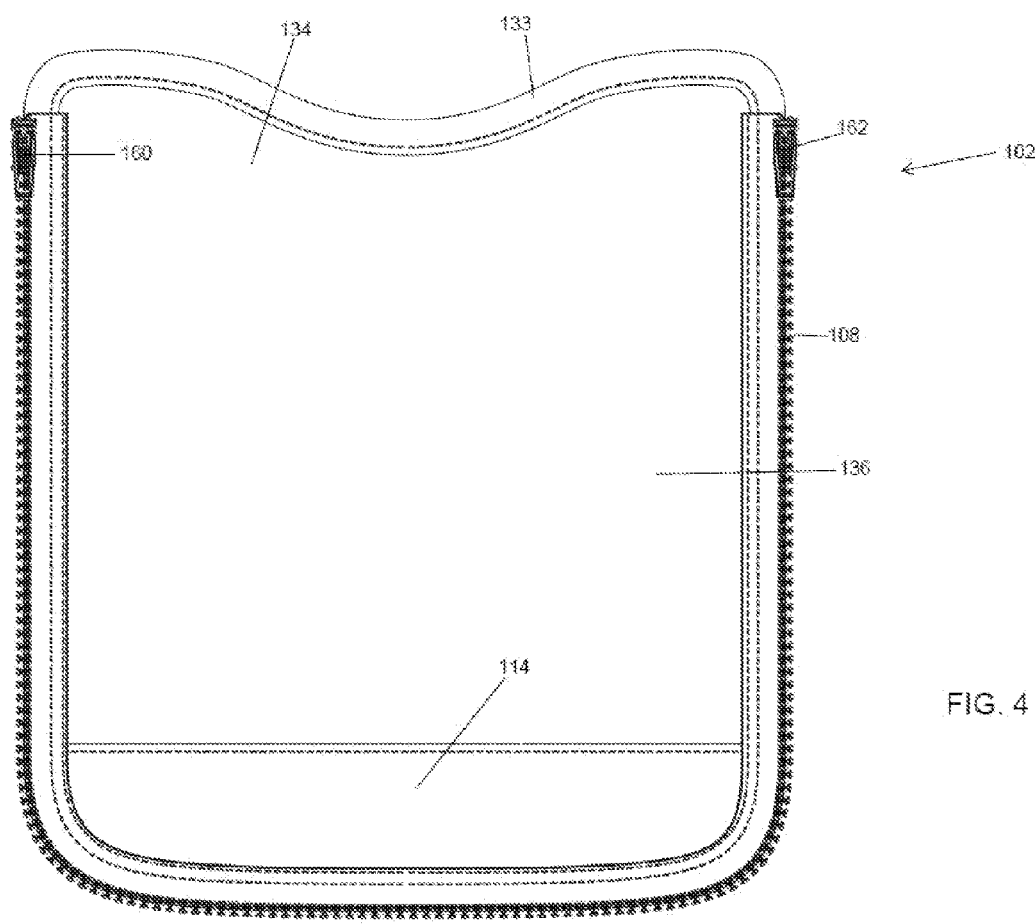
FIG. 4 is a second view of the first panel the convertible flash bag of FIG. 1.

FIGS. 3 and 4 illustrate features of the first panel 102. FIGS. 3 and 4 show opposite sides of first panel 102 unfolded. The first panel 102 includes a first side 130 that can be comprised of a first material 132, such as ballistic nylon (e.g., CORDURA®), which may be textured and can be of any desired color (e.g., black), and a second side 134 that is comprised of a reflective material (e.g., white) 136. In one embodiment, the first side 130 is colored black so that it can be used to absorb light. In that embodiment, the texture is such that light is less likely to be reflected. The reflective material is intended to be capable of reflecting a light and direct the light in a specific direction or broaden the light by bouncing the light off of the reflective material 136. Foam or other padding material (not shown) can be arranged between the first material 132 and the reflective material 136, and piping 138 can extend about the perimeter of the first panel 102 to form a first panel boundary. The first panel 102 can have a thickness of approximately about 5 mm to 7 mm (0.20 to 0.40 inches). The first panel 102 can also includes a first connecting element 108 that substantially surrounds the first panel 102. As shown, the first connecting element 108 is a first portion of a zipper that is stitched to the first panel 102 to fix the first connecting element 108 to the first panel 102. However, the first connecting element 108 can be fixed to the first panel 102 by any other securing means that are known or may become known, which ensure the first connecting element 108 is fastened to the first panel 102. The first panel 102 can further include a curved periphery 133 (see FIG. 4) aid in grasping and removing a flash 200 from when the enclosure 100 is in the closed position. In an embodiment, the enclosure 100 is designed to house a flash 200 that is 6.5 mm (8.13 inches) by 73.15 mm (2.88 inches) by 50.8 mm (2 inches). However, the enclosure 100 can be designed to accommodate a flash of any desired size.

In an embodiment, the first panel 102 includes at least a first securing element 112 and a second securing element 114 that can be Velcro® (e.g., 38 mm wide) or any other securing means including magnets, snaps, buttons or reusable adhesive that are known or may become known, which can aid in securing at least a portion of the first panel 102 to an object, including the second panel 104, but which may also allow the first panel 102 to be disengageable from an object if a sufficient force is applied thereto. Each securing element 112, 114 is attached to first panel 102 by stitching or some similar known way.

Figure 5:
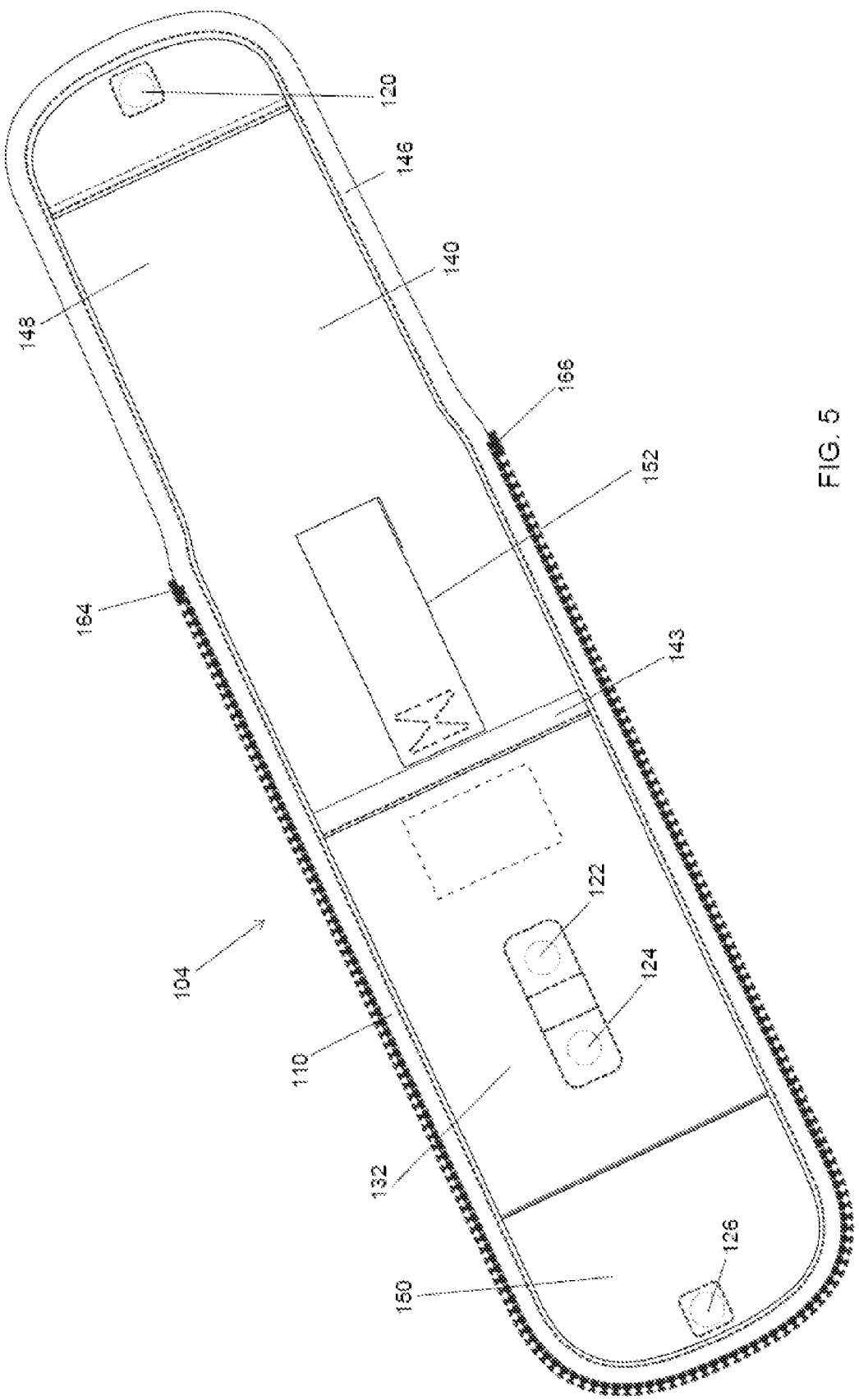
FIG. 5 is a first view of a second panel of the convertible flash bag of FIG. 1.
Figure 6:
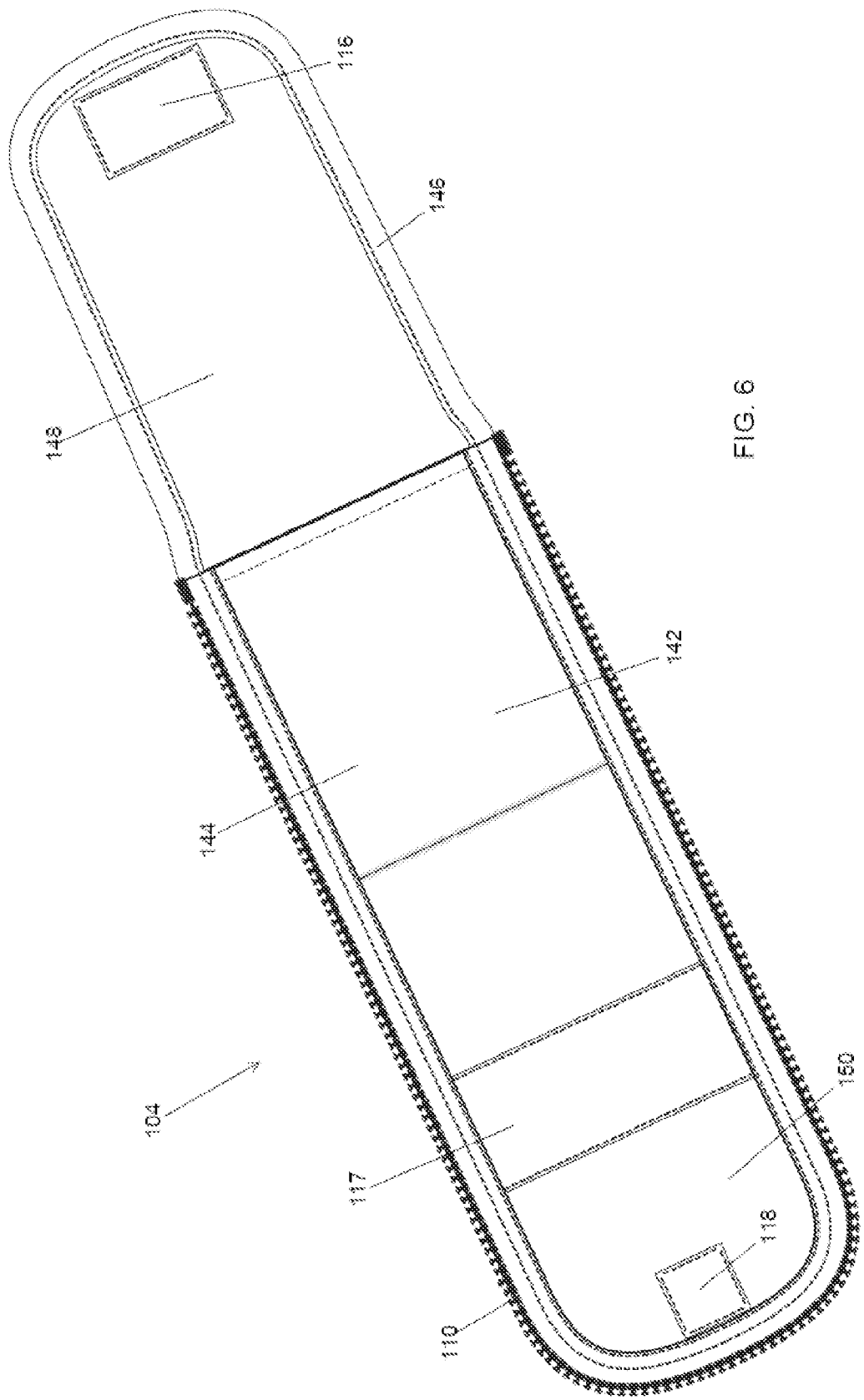
FIG. 6 is a second view of the second panel of the convertible flash bag of FIG. 1.

FIGS. 5 and 6 illustrate features of the second panel 104. FIGS. 5 and 6 show opposite sides of second panel 104 unfolded. Similar to the first panel 102, a first side 140 of the second panel 104 can be comprised of a first material 132, such as ballistic nylon (e.g., CORDURA®) that may be textured and can be of any desired color (e.g., black), a second side 142 can include a reflective material (e.g., white) 144, a foam or other material (not shown) can be arranged between the first and second sides 140, 142 of the panel 104 and piping 146 can extend about the perimeter of the second panel 104 to form a second panel boundary. A second connecting element 110 that is releasably connectable to the first connecting element 108 to connect the first and second panels 102, 104 together to form the enclosure 100 substantially surrounds the second panel 104. As shown, the second connecting element 110 is a second portion of a zipper that is stitched to the second panel 104 to fix the second connecting element 110 to the second panel 104. However, the second connecting element 110 can be fixed to the panel 104 by any other securing means that are known or may become known, which ensure the second connecting element 110 is fastened to the second panel 104.

As illustrated in FIGS. 5 and 6, the second panel 104 is generally rectangular. One portion of second panel 104, at one end and beyond the termini of the connecting element 110, is not surrounded by the connecting element 110 and is, instead, unsecured so as to serve as a flap for a variety of purposes. This portion, first protrusion 148, is foldable in a first position to be secured to first panel 102. First protrusion 148 can be placed in multiple positions to (1) provide a closure to further protect an enclosed flash (see FIG. 1), or (2) can otherwise fold on itself (see FIGS. 10-11) where it can optionally allow for either reflective or non-reflective side visibility. A second protrusion 150 that is foldable in a first position and securably contactable with the first side 140 of the second panel 104 and is foldable in a second position and securably contactable with the second side 142 of the second panel 104. Both the first and second side of the first protrusion 148 can be comprised of any material, including a combination of ballistic nylon and leather.

As indicated above, positioned beneath the first material 132 at the first protrusion 148 is at least one connecting element 120, and positioned beneath the first material 132 at the second protrusion 150 is at least one other connecting element 126. Between the connecting elements 120, 126 that are secured at the first and second protrusions 148, 150, are additional connecting elements 122, 124. The connecting elements 120, 122, 124, 126 can be comprised of positive and negative magnets or any other securing means that are known or may become known, which can aid in securing the first projection 148 and/or second projection 150 to the first side 140 of the second panel 104, but which also allows for disengagement of the projections 148, 150 upon an application of force. That is, upon bending the first protrusion 148, the connecting element 120 can interact with the connection element 122 and releasably secure the first protrusion 148 to the first side 140 of the second panel 104 and upon bending the second protrusion 150, the connecting element 126 can interact with the connection element 124 and releasably secure the second protrusion 150 to the first side 140 of the second panel 104.

Additionally, on the second side 142 of the second panel 104 there are at least three securing elements 116, 117 and 118. As shown, these securing elements are Velcro® elements that are attached by stitching to the second panel 104. However, any other securing means and/or attaching means including magnets, snaps, buttons or reusable adhesive that are known or may become known, which can aid in securing at least a portion of the second panel 104 to an object, including the first panel 102, but which may also will allow the second panel 104 to be disengaged from the object if a sufficient force is applied thereto can be used in place of Velcro®.

FIGS. 7 and 8 depict a top and a bottom view of portions of the strap 106 that may be attached to the first panel 102 and/or the second panel 104. Specifically, the strap 106 can be attached to the securing element 114 of the first panel 102 and/or the securing element 117 of the second panel 104. When the strap 106 is not being used, it can be stored in the external pocket 143 formed in the second panel 104. The strap 106 can include elastic properties that allow it to expand and compress and at least one material 154 that creates a non-slip surface fixed to at least one side of the strap 106. In an embodiment, the entire strip 106 could be comprised of the material 154. In another embodiment, the material 154 can include silicone strips or any other material that is known or may become known, which increases friction to in turn prevent the strap from sliding off of an object, but which allows the strap to be disengaged from the object if a sufficient force is applied thereto. The strap 106 can also include a Velcro® hook 156 that is fixed to at least one side of the strap 106 by any means that is known or may become known, including stitching or by using an adhesive. The hook 156 serves as a closure point for the strip 106 when the strip 106 is wrapped around the flash head and attached to the securing element 114 of the first panel 102 and/or the securing element 117 of the second panel 104. The opposite side (reverse from where the material 154 is located) of strap 106 (FIG. 8) is made of a Velcro® loop material. This material will allow strap 106 to hold panels 102, 104 to an object via Velcro® hooks on securing elements 114 and 117, such as the configurations in FIG. 9-12. Additionally, a tag 158 that can include a company name and/or logo can be fixed to the strap 106. In an embodiment, the strap 106 can be approximately about 12 inches (305 mm) in length and 1½ inches (38 mm) in width. The length allows the strip 106 to be fitted to flashes of various sizes.

FIG. 9 illustrates an embodiment of the first panel 102 attached to a flash unit 200. The first panel 102 is arranged to substantially encompass the light source of the flash unit 200 and direct light emitted from the light source. As shown, the first panel 102 is attached to the flash unit 200 by the strap 106 which is fixed all the way around by the entirety of securing element 114 attaching to the entirety of the Velcro® loop side of strap 106, or alternatively, could be fixed at one end near a first side wall and at the other end near a second side wall. In this embodiment, the reflecting surface cups the light source and extends over the light source to provide three sides of reflectivity.

FIGS. 10 and 11 illustrate embodiments of the second panel 104 attached to the flash unit 200 where second panel 104 is engaged with a flash when the flash is in use. In FIG. 10, the first protrusion 148 of the second unit 104 is folded in the first direction and attachable to the second side 142 of the second panel 104, covering the reflective surface 144 of the second panel 104 so as to provide a non-reflective one-sided modifier. In FIG. 11, the first protrusion 148 of the second unit is folded in a second direction and attachable to the first side 140 of the second panel 104 by the securing elements 120, 122. As shown in FIG. 11, the light that can illuminate from the flash unit 200 can come in contact with the reflective material 144 and the reflective material 144 can in turn aid in directing the light coming from the flash unit 200. In both FIGS. 10 and 11, the second panel 104 is attached to the flash unit 200 by the strap 106 which is fixed to the second panel 104.

FIG. 12 illustrates an additional embodiment whereby first panel 102 and second panel 104 are connected to one another to form a light box in which the first connecting element 108 and the second connecting element 110 are partially detached from each other by sliding the sliders 160, 162 in opposite directions to form an opening at the base of the enclosure 100 and the first protrusion 148 of the second element 104 is folded in a second direction and attachable to the first side 140 of the second panel 104 by the securing elements 120, 122. As shown, a flash unit 200 can be securably inserted into the opening at the base of the enclosure 100 and securable via the strap 106 that is fastenable to the first and second panel 102, 104 and/or a compressible force surrounding the flash, creating a light box through which light that emanates from the flash unit 200 can be directed therethrough. The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention.

The invention claimed is:

1. A modifiable enclosure for protectively carrying a camera flash, said flash including a light emitting surface, said enclosure being adaptable for directing light from said light emitting surface, the enclosure comprising:
   a first panel having a reflective side and a non-reflective side and including a first connecting element extending substantially about its periphery; and
   a second panel having a reflective side and a non-reflective side and including a second connecting element extending substantially about its periphery;
   wherein said first connecting element and said second connecting element are configurable in a first way to form a protective pouch for storing said flash, and at least one of said first panel and said second panel is configurable in a second way to form a light modifier for said light emitting surface.

2. The enclosure of claim 1, further comprising at least one elasticized strap that is releasably fastenable to at least one of said first panel and said second panel so as to secure said flash to at least one of said panels.

3. The enclosure of claim 2, wherein one of said panels is configured such that said reflective side of said panel at least partially surrounds said light emitting surface of said flash and said strap is adapted to secure said flash to said panel.

4. The enclosure of claim 2, wherein one of said panels is configured such that said non-reflective side of said panel at least partially surrounds the light emitting surface of said flash and said strap is adapted to secure said flash to said panel.

5. The enclosure of claim 2, wherein one of said panels further comprises a plurality of attaching elements, and said strap is attached to said one of said panels using at least one of said attaching elements and said strap is used to encircle a portion of a flash so as to secure said flash to said one of said panels.

6. The enclosure of claim 5, further comprising a flap at one end, wherein at least one of said attaching elements is fixed to said one of said panels at said flap and said non-reflective side of said panel and said flap is adapted to be folded over and releasably fixed to said non-reflective side of said panel by said attaching elements to allow the reflective side of said panel to reflect light from said light emitting surface.

7. The enclosure of claim 6, wherein said flap is adapted to be folded over such that the reflective side is hidden from view.

8. The enclosure of claim 6, wherein said flap is adapted to be folded over such that the reflective side is exposed for use as a light modifier.

9. The enclosure of claim 6, wherein at least one of said panels includes a protrusion extending therefrom at an end opposite said end with said flap, includes at least one of said attaching elements affixed thereto, and is releasably fastenable to at least said non-reflective side of said panel.

10. The enclosure of claim 1, wherein said first panel and said second panel are at least partially attached to each other by said respective connecting elements so as to encircle said light emitting surface in such a manner that said reflective side of said first panel and said reflective side of said second panel together provide a four-sided reflective surface for said flash.

11. The enclosure of claim 1, wherein said first connecting element and said second connecting element are a first portion and a second portion, respectively, of a zipper, where said zipper further includes a plurality of sliders.

12. An adaptable light modifier for a light emitting surface of a flash comprising:
   a first panel having a reflective side and a non-reflective side and including a first connecting element extending substantially about its periphery;
   at least one elasticized strap that is releasably fastenable to said first panel so as to secure said flash to said panel;
   a second panel comprising a second connecting element extending substantially about its periphery; and
   a flap at one end;
   wherein said first panel is adaptable to at least partially surround said light emitting surface to form a light modifier for light emitted from said light emitting surface; said second panel is attachable to said first panel with said first and second connecting elements and two sliders to form a four-sided light modifier or a pouch; one of said panels further comprises a plurality of attaching elements, and said strap is attached using a plurality of said attaching elements; at least one of said attaching elements is fixed to said one of said panels at said flap and said non-reflective side of said panel; and said flap is adapted to be folded over and releasably fixed to said non-reflective side of said panel by said attaching elements.

13. The light modifier of claim 12, wherein said flap is adapted to be folded over such that the reflective side is hidden from view.

14. The light modifier of claim 12, wherein said flap is adapted to be folded over such that the reflective side is exposed for use as a light modifier.

15. The light modifier of claim 12, wherein at least one of said panels includes a protrusion extending therefrom at an end opposite said end with said flap, includes at least one of said attaching elements affixed thereto, and is releasably fastenable to at least said non-reflective side of said panel.

16. The light modifier of claim 12, wherein one of said panels is configured such that said reflective side of said panel at least partially surrounds said light emitting surface of said flash and said strap is adapted to secure said flash to said panel.

17. The light modifier of claim 12, wherein one of said panels is configured such that said non-reflective side of said panel at least partially surrounds the light emitting surface of said flash and said strap is adapted to secure said flash to said panel.

* * * * *